United States Patent
Krendelev et al.

(10) Patent No.: US 9,215,219 B1
(45) Date of Patent: *Dec. 15, 2015

(54) METHOD FOR PROTECTING DATA USED IN CLOUD COMPUTING WITH HOMOMORPHIC ENCRYPTION

(71) Applicant: Parallels IP Holdings GmbH, Schaffhausen (CH)

(72) Inventors: Sergey Krendelev, Novosibirsk (RU); Alexander G. Tormasov, Moscow (RU)

(73) Assignee: Parallels IP Holdings GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/564,256

(22) Filed: Dec. 9, 2014

Related U.S. Application Data

(63) Continuation of application No. 13/667,167, filed on Nov. 2, 2012, now Pat. No. 8,925,075.

(60) Provisional application No. 61/556,507, filed on Nov. 7, 2011.

(51) Int. Cl.
*H04L 9/00* (2006.01)
*H04L 29/06* (2006.01)
*H04L 9/06* (2006.01)

(52) U.S. Cl.
CPC .......... *H04L 63/0457* (2013.01); *H04L 9/0637* (2013.01); *H04L 63/0823* (2013.01)

(58) Field of Classification Search
CPC ................................ H04L 9/0637; H04L 9/28
USPC ........................................................... 726/22
See application file for complete search history.

(56) References Cited

U.S. PATENT DOCUMENTS

| | | | |
|---|---|---|---|
| 6,937,728 | B1 | 8/2005 | Abe et al. |
| 8,280,040 | B2 | 10/2012 | Frank |
| 2012/0066510 | A1 | 3/2012 | Weinman |
| 2012/0278622 | A1 | 11/2012 | Lesavich et al. |
| 2013/0097417 | A1* | 4/2013 | Lauter et al. ................. 713/150 |

* cited by examiner

*Primary Examiner* — Longbit Chai
(74) *Attorney, Agent, or Firm* — Bardmesser Law Group

(57) ABSTRACT

A method for protection of cloud computing includes homomorphic encryption of data. Partially or fully homomorphic encryption allows for data within the cloud to be processed without decryption. A partially or fully homomorphic encryption is provided. The proposed scheme can be used with both an algebraic and analytical approaches. A cloud service is implemented on a server. A client encrypts data using fully homomorphic encryption and sends it to the server. The cloud server performs computations without decryption of the data and returns the encrypted calculation result to the client. The client decrypts the result, and the result coincides with the result of the same calculation performed on the initial plaintext data.

16 Claims, 1 Drawing Sheet

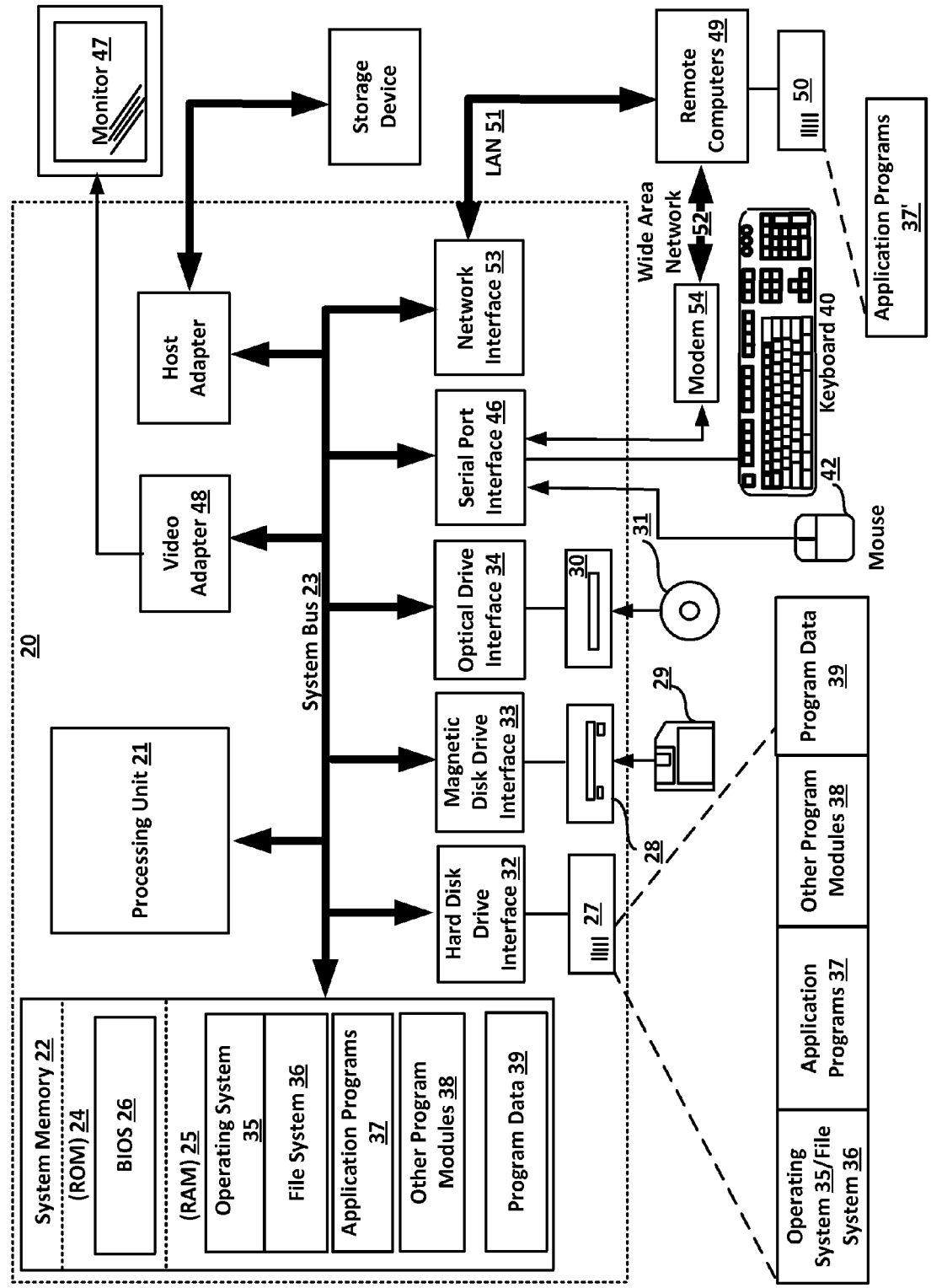

METHOD FOR PROTECTING DATA USED IN CLOUD COMPUTING WITH HOMOMORPHIC ENCRYPTION

CROSS-REFERENCE TO RELATED APPLICATION

This application is a continuation of U.S. patent application Ser. No. 13/667,167, filed on Nov. 2, 2012, which is a non-provisional application of U.S. Provisional Pat. App. Ser. No. 61/556,507, filed Nov. 7, 2011, which are incorporated by reference herein in their entirety.

BACKGROUND OF THE INVENTION

1. Field of the Invention

This invention relates to data encryption methods, and more particularly, for protection of cloud system computations by homomorphic encryption.

2. Description of the Related Art

A conventional cloud is a computation resource that is provided to a user by a provider. All cloud services and infrastructure are implemented by the provider and are hidden from the user. The clouds can be divided into three classes:

Infrastructure as a Service—the provider implements functionality of Virtual Machines (VMs) and controls the infrastructure of the VMs that can be created, modified or deleted by the client (user). A user can decide how to use the Service. An example of such system is Amazon Web Services.

Platform as a Service—the provider provides to a user a certain platform for running applications. The provider is responsible for functionality of the platform and the user only provides an application to be launched on the platform. In this case, a cloud can be used for specialized tasks or types of tasks. An example of such system is Google App Engine platform.

Software as a Service—the provider provides a complete application for performing certain tasks. In this case, the provider is responsible for servicing the infrastructure, where the service runs, and for developing the application that supports the service. Such cloud has specific narrow specialization only for a particular task. An example of such system is Gmail.

Only the first two classes allow for running user application (i.e., logic) within the cloud. Protected cloud computing is a system where operations executed within the cloud cannot be determined from outside. Also, some data needs to be securely stored within the cloud for a long time. Additionally, transferring data into the cloud needs to be protected as well.

Thus, the protected cloud computing includes the following:
secure data storage within the cloud;
secure data processing within the cloud; and
secure data transfer in and out of the cloud.

Processing of data within the cloud is performed constantly. The cloud data often contains some critical personal data that can be accessed based on the technical limitation of the cloud. So, the only way to protect the data is to encrypt the files, so the perpetrator will not be able to read them.

Therefore, it is desired to have a system for protected cloud computing. Such system should have data in an encrypted form that cannot be read, even if the file is accessed. The data should be passed into the cloud already in the encrypted form. The encryption needs to be performed at the client site, so the cloud service does not know how the data is encrypted.

Also, the cloud should be able to process the encrypted data without decrypting it. Otherwise, the cloud becomes little more than a secure storage. Each operation on data would require sending the data back to the client for decryption and then sending the data back to the cloud for processing. Alternatively, an encryption key can be sent to the cloud for data decryption. However, this would jeopardize the data within the cloud.

Conventional cloud services do not provide completely secure data storage. In some rare cases the data can be encrypted on the client site. In other implementations the data is encrypted with the key that is stored in the same cloud. Both cases are not secure and are not convenient for efficient cloud computing. For example, personal or corporate taxes are calculated by third party services. It is obviously desired to not disclose some income information to the third parties. The personal data needs to be encrypted and sent over for processing. Then the results are received and decrypted.

Therefore, there is a need in the art to process encrypted data within the cloud without decryption. Accordingly, a method for homomorphic encryption of the cloud data is desired, so the data can be processed without decryption.

SUMMARY OF THE INVENTION

Accordingly, the present invention is related to a system and method for protection of cloud computing system by homomorphic encryption that substantially obviates one or more of the disadvantages of the related art.

In one embodiment, system for protected cloud computing includes a server receiving encrypted data from a client; the server performing fully homomorphic calculations for the client without decryption of the encrypted data and providing a result of the calculations to the client for decryption. A finite set of initial elements are generated on the client and are fully homomorphically encrypted into a set of n encrypted elements, such that all calculations on unencrypted elements correspond to the same calculations on encrypted elements. The m encrypted elements belong to the finite set of the initial elements and each of the m encrypted elements has only one corresponding initial element. The initial elements are encrypted using an n-bit secret key $z_0$ that belongs to a Galois field $G(2^n)$. For any initial element u of a Galois field $G(2^n)$ there are n elements $a_1, a_2, \ldots, a_d$ of $G(2^n)$ for which $a_0 = u - (a_1 z_0 + a_2 (z_0)^2 + \ldots + a_d(z_0)^d)$, and a polynomial $v(z) = a_0 + a_1 z + a_2 z^2 + \ldots + a_d z^d$ from $G(2^n)[z]$ corresponds to u with $v(z_0) = u$, with the coefficients $a_1, a_2, \ldots, a_d$ used as a public encryption key. The encryption uses an encryption polynomial $h(z) = u + (z - z_0) * r(z)$ where $r(z)$ is an arbitrary polynomial from $G(2^n)[z]$, and $z_0$ and u are fixed elements of $G(2^n)$.

Fully homomorphic encryption allows for data within the cloud to be processed without decryption. Homomorphic encryption is a type of encryption where operations on unencrypted data have corresponding operations on encrypted data. If an operation O is performed on the encrypted data and then the data is decrypted, the result is the same as if the operation O has been performed on the unencrypted data According to the exemplary embodiment, a special scheme for homomorphic encryption is provided. The proposed scheme can be used with both algebraic and analytical approaches. A cloud service is implemented on a server. A client encrypts data and sends it to the server. The cloud server performs computations without decryption of the data and returns the encrypted calculation result to the client. The client decrypts the result and the result coincides with the result of the same calculation performed on the plaintext data.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings:

FIG. 1 illustrates a schematic of an exemplary computer system that can be used for implementation of the invention.

DETAILED DESCRIPTION OF THE PREFERRED EMBODIMENTS

Reference will now be made in detail to the preferred embodiments of the present invention.

A method for homomorphic encryption of the cloud data is provided. Fully homomorphic encryption allows for data within the cloud to be processed without decryption. Fully homomorphic encryption schemes are malleable. A cryptosystem is malleable if it is possible to transform one ciphertext into another (in this case—math operations) without the decryption.

A principle of homomorphism can be described as follows:

Let $f: A \rightarrow B$ where A and B are rings with addition, multiplication, and optionally zero and one.

Then, f is homomorphism of the rings, if:
$f(a +_A b) = f(a) +_B f(b)$
$f(a \times_A b) = f(a) \times_B f(b)$
$f(1_A) = 1_B$
$f(0_A) = 0_B$ Homomorphism operations are secure (by definition), which is an inherent feature of any homomorphic encryption. Homomorphic encryption is a type of encryption where operations on unencrypted data have corresponding operations on encrypted data. If an operation O is performed on encrypted data and then the data is decrypted, the result is the same as if the operation O has been performed on unencrypted data.

Accordingly, fully homomorphic encryption provides the above condition for all operations. Otherwise, the encryption is partially homomorphic. Fully homomorphic encryption satisfies all of the requirements for encryption of protected cloud services. In other words, fully homomorphic encryption allows for encryption of data and performing operations on the encrypted data without decryption.

According to the exemplary embodiment, a special scheme for homomorphic encryption is provided. The proposed scheme can be used with both an algebraic and analytical approaches. The algebraic approach can be described as follows. Formal polynomials create a ring A[x] relative to addition and multiplication.

An example of homomorphism of the rings is as follows:
1. Transformation $f(x) = x + c$, $f^*: A[x] \rightarrow A[x]$ A resulting (transformed) f* generated from f should be a homomorphism of the rings.

In case of formal polynomials (considered to have the same degree)
$f^*(\bar{a}_m + \bar{b}_m) = f^*((a_0 + b_0, a_1 + b_1, \ldots, a_m + b_m))$ The corresponding resulting polynomial is
$R(x) = (a_0 + b_0) + (a_1 + b_1)x + \ldots + (a_m + b_m)x^m$
while $f(R(x)) = (a_0 + b_0) + (a_1 + b_1)(x + c) + \ldots + (a_m + b_m)(x + c)^m$ On the other hand, if P(x) and Q(x) correspond to formal polynomial $\bar{a}_{(m)}$ and $\bar{b}_{(m)}$, then
$f(P(x)) + f(Q(x)) = a_0 + a_1(x + c) + \ldots + a_m(x + c)^m + b_0 + b_1(x + c) + \ldots + b_m(x + c)^m$ Accordingly, $f^*(\bar{a}_{(k)} + \bar{b}_{(m)}) = f^*(\bar{a}_{(k)}) + f^*(\bar{b}_{(m)})$ A product can be described in a similar manner:
$P(x) \cdot Q(x) = a_0 b_0 + (a_0 b_1 + a_1 b_0)x + (a_0 b_2 + a_1 b_1 + a_2 b_0)x^2 + \ldots + a_m b_m x^{m+m}$
$f^*(P(x) \cdot Q(x)) = a_0 b_0 + (a_0 b_1 + a_1 b_0)(x + c) + (a_0 b_2 + a_1 b_1 + a_2 b_0)(x + c)^2 + \ldots + a_m b_m (x + c)^{m+m}$ Then,
$f^*(P(x)) \cdot f^*(Q(x)) = a_0 b_0 + (a_0 b_1 + a_1 b_0)(x + c) + (a_0 b_2 + a_1 b_1 + a_2 b_0)(x + c)^2 + \ldots + a_m b_m (x + c)^{m+m}$ Which coincides with $f^*(P(x) \cdot Q(x))$ Accordingly, $f^*(\bar{a}_{(k)} \cdot \bar{b}_{(m)}) = f^*(\bar{a}_{(k)}) \cdot f^*(\bar{b}_{(m)})$ Also, note that f transforms 0 into 0, and 1 into 1.

Consequently, based on the definition, transformation, f creates homomorphism of the rings f* from f. In other words
$f^*(a + A[x]b) = f^*(a) + A[x]f^*(b)$ Consider a transformation $g(x) = c \cdot x$.

It is necessary to prove that g* transformed from g is also homomorphism of the rings.

A sum is:
$g^*(R(x)) = a_0 + b_0 + (a_1 + b_1)cx + \ldots + (a_m + b_m)(cx)^m$.
$g^*(P(x)) + g^*(Q(x)) = a_0 + a_1(cx) + \ldots + a_m(cx)^m + b_0 + b_1(cx) + \ldots + b_m(cx)^m$ Accordingly, $g^*(\bar{a}_{(k)} + \bar{b}_{(m)}) = g^*(\bar{a}_{(k)}) + g^*(\bar{b}_{(m)})$ The product is:
$g^*(P(x) \cdot Q(x)) = a_0 b_0 + (a_0 b_1 + a_1 b_0)(cx) + (a_0 b_2 + a_1 b_1 + a_2 b_0)(cx)^2 + \ldots + a_m b_m$ Then
$g^*(P(x)) \cdot g^*(Q(x)) = a_0 b_0 + (a_0 b_1 + a_1 b_0)(cx) + (a_0 b_2 + a_1 b_1 + a_2 b_0)(cx)^2 + \ldots + a_m b_m (cx)^{m+m}$ Which corresponds to $g^*(P(x) \cdot Q(x))$ Accordingly, $g^*(\bar{a}_{(k)} \bar{b}_m) = g^*(\bar{a}_{(k)}) g^*(\bar{b}_m)$ Thus, transformation of g transforms 0 into 0, and 1 into 1.

Therefore, transformation g creates homomorphism of the rings $g^*$ $g^*(a + A[x]b) = g^*(a) + A[x] g^*(b)$.

Any polynomial $P(x) = a_0 + a_1 x + a_2 x^2 + \ldots + a_m x^m$ creates a homomorphism P* rings of a formal polynomial. Thus:
$P^*: A[x] \rightarrow A[x]$
1. $P^*(a + A[x]b) = P^*(a) + A[x]P^*(b)$
2. $P^*(a \cdot A[x]b) = P^*(a) \cdot A[x]P^*(b)$
3. $P^*(0_{A[x]}) = 0_{A[x]}$
4. $P^*(1_{A[x]}) = 1_{A[x]}$ Homomorphic encryption in case $Z_2[x]$.

Let the ring have only two elements 0 and 1.

Two elements need to be encrypted based on the above algorithm for performing operations on them. An element $z_1$ has a formal polynomial $(z_1, a_a, a_2, \ldots, a_m)$. Application of homomorphism P results in a formal polynomial $(q_0, q_1, q_2, \ldots, q_{m+p})$ Encryption of $z_2$ results in $(r_0, r_1, r_2, r_{m+p})$.

Accordingly, after the operations are performed, a formal polynomial is produced. This polynomial, once decrypted, gives the result in a first position. If operations are performed on polynomials (both polynomials are the results of encryption of $z_1$ and $z_2$) in the form $z_1 + f_1(z_1) + f_2(z_1)$ and $z_2 + g_1(z_2) +$ $g_2(z2)$, then a multiplication and addition will result in something like $(z_1*z_2+z_1)+(f_1(z_1)*g_1(z_2)+f_1(z_1))+\ldots$ The first element in the brackets can be used as the result of the operation, if the "tail" is deleted from data that is not significant, from the perspective of the task that is being performed. This example shows that functionality, in the proposed method, is achieved by making the computations more complex and by increasing the amount of computation necessary, even for simple arithmetic operations. Multiplication and addition can be viewed as operations on matrices, and the size of the matrix becomes apparent during decryption, which is needed to identify the meaningful portion of the element.

For example, in case of the operation $\bar{q}_{m+p}+\bar{q}_{m+p}\cdot\bar{r}_{m+p}$, after decryption, the first position in the resulting formal polynomial will have $z_1+z_1\cdot z_2$.

For example, to find value $m_1+m_2$ bits of polynomials $(m_1,a,b)$, $(m_2,c,d)$ are compared. Homomorphism created by the polynomial $P(x)=p+q\cdot x$ is applied. The resulting polynomials are:

$(m_1+ap+bp^2, aq+2bpq, bq^2)$
$(m_2+cp+dp^2, cq+2dpq, dq^2)$

Adding them results in:
$R=(m_1+m_2+ap+cp+bp^2+dp^2,\ aq+cq+2bpq+2dpq, bq^2+dq^2)$ In order to decrypt, the polynomial
$R(x)+m_1+m_2+ap+cp+bp^2+dp^2+\ (aq+cq+2bpq+2dpq)x+(bq^2+dq^2)x^2$
is divided by $p+qx$, which gives the remainder $m_1+m_2$, as a result.

In case of multiplication, the brackets are not open and the formal polynomial looks like:
$m_1+a(p+qx)+b(p+xq)^2$
$m_2+c(p+qx)+d(p+xq)^2$ Multiplication of the encrypted polynomials results in:
$m_1m_2+(m_1c+m_2a)(p+qx)+$
$+(m_1d+ac+m_2b)(p+qx)^2+ (ad+bc)(p+qx)^3+bd(p+qx)^4$ Note that if the brackets are open, it will not be possible to recreate anything without knowing $p+qx$.

However, if the resulting polynomial divided by $p+qx$ the needed bit is produced.

An analytical approach can be described as follows. Consider a class of functions over set M with values located on the ring A.

These functions create a ring $F=A(M)$ relative to discrete addition and multiplication operations. Let $G=A(S)$, where S is a mathematical set. Consider transformation $\phi: M \to S$. This transformation can be called a variable substitution—$x=\phi(y)$, $x \in S$, $y \in M$. Such a substitution of variables creates homomorphism $\phi^*$ of the rings of functions: $\phi^*: F \to G$.

This can be proven as follows. Let $f(x), g(x)$ be functions of ring F and $\phi^*(f(x))$, $\phi^*(g(x))$ be functions of ring G.

$f(x)+g(x) \to \phi^*(f(x)+g(x))=$
1. $=f(\phi(x))+g(\phi(x))=$
$=\phi^*(f(x))+\phi^*(g(x))$
$f(x)\cdot g(x) \to \phi^*(f(x)\cdot g(x))=$
2. $=f(\phi(x))\cdot g(\phi(x))=$
$\phi^*(f(x))\cdot^*(g(x))$
3. $1_F \to 1_G$
4. $0_F \to 0_G$ Thus, $\phi^*$ is really a homomorphism of the rings of the functions.

One example can use polynomials of rings of real numbers, integers, or prime numbers.

$R[x]$—a ring of polynomials.

Any polynomial $P(x)$ creates homomorphism $P^*: R[x] \to R[x]$.

In a client-server model, this can be implemented as follows. A client wants to perform calculations on the server in such a way that the server cannot know what data is involved in the calculations. For example, a client wants to calculate a value of a polynomial function $f(x_1, x_2, \ldots x_n)$ at a point $(a_1, a_2, \ldots a_n)$. The following steps are executed:

a secret key $x_0$ is randomly picked on the client site, $x_0$ is a real number;

for each number $a_i$ from a vector of values selected $b_i$, $c_i$, such that $b_i x_0 + c_i = a_i$;

linear polynomials are sent to the server in a form of $b_i x + c_i$ along with a polynomial function $f(x_1, \ldots x_n)$;

the client requests the server to substitute $x_i$ with linear polynomials. The server substitutes the polynomials into the function f :

$f(b_1 x + c_1, \ldots, b_n x + c_n)$.

Then, the server opens the brackets and sends the result to the client. Thus, the client receives the coefficients of the polynomial that assumes the desired value at a point $x_0$.

The client substitutes $x_0$ into the resulting polynomial function, and finds the desired value. Note that the server does not know the data value, for which the client wants to calculate the values of the function.

This scheme of homomorphic encryption allows to protect operations and to sort the encrypted data. Since the operations are performed with real numbers, the point $x_0$ has an area where lines corresponding to $a_i x + b_i$ do not intersect. Then a correct order is kept at point $x_0$, but it remains unchanged in the area.

The use of real numbers permits taking advantage of orthogonality of the transformations, in other words, different initial data will always give different encryption results. Also, for any pair of encrypted texts strings, it is possible to identify a point $x_0$, such that in its neighborhood, linear functions derived from decryption results maintain their relative values (smaller-larger) comparison, both before and after encryption and decryption. For each pair, there is a particular point $x_0$, that can be identified without decryption. The use of these points $x_0$ permits sorting of the list, where the list does not have identical elements.

Accordingly, an element can be given to the server without disclosing the encryption key.

The following schemes for fully homomorphic encryption are used in the exemplary embodiment.

Domingo-Ferre scheme.

Two prime numbers are selected—p and q, $n=pq$. A positive integer d is also selected. Then (d,n) is an open key. Then, from $Z_p$ and $Z_q$, elements $r_p$ and $r_q$ are used, that create large multipliable sub-groups in $Z_p$ and $Z_q$, respectively. Then (p, q, $r_p$, $r_q$) is a secret key.

The encryption is implemented as follows.

In order to encrypt element $a \in Z_n$, it has to be separated into a sum $$\sum_{i=0}^{d} a_i \bmod n, \ a_i \in Z_n.$$

Then the encryption cipher looks like:
$E(x)=[a_1 r_p \bmod p, a_1 r_q \bmod q], \ldots, [a_d r_p^d \bmod p, a_d r_q^d \bmod q]$ Decryption is performed using the Chinese remainder theorem.

Alternatively, the scheme can be implemented as follows. In order to encrypt an element $a \in Z_n$ a polynomial $f(x)$ with coefficient from $Z_n$ is selected such that $f(x)=a_0+a_1 x+\ldots+a_d x^d$, while $f(1)=a$.

In other words, $a=a_0+a_1x+\ldots+a_n$ is an analog of $$\sum_{i=0}^{d} a_i \bmod n, \quad a_i \in Z_n.$$

Let $r_p$, $r_q$ be the same as in the standard implementation (above).

Then, encryption is the application of homomorphisms $\phi_p=r_p y$ and $\phi_q=r_q y$ over polynomial f(x). The cipher is comprised of a pair of coefficients of the polynomials $f_p(y)=f(\phi_p(x))$, $f_q(y)=f(\phi_q(x))$ based on modulus of p and q, respectively.

Another encryption scheme that can be used in the exemplary embodiment is the Craig-Gentry scheme. Craig Gentry's fully homomorphic encryption uses ideal lattices. Calculations are performed over a field $Z_2$. The two elements can be considered as bits. Let m be a certain bit having a corresponding number that is selected as follows. Three numbers r, k, q are selected, while r<<k, k is a secret key.

Calculate $c=2r+m+(2k+1)q$. Note that:
$c \bmod 2 = (m+q) \bmod 2$     (1)
$c \bmod 2k+1) \bmod 2 = m$     (2)

This means that knowledge of c does not define bit m (1), however if k is known, the bit m can be definitively restored (2).

Then, the bit operations according to this scheme will look as follows:

Let $m_1$, $m_2$ to be bits. Then:
$c_1=2r_1+m_1+(2k+1)q_1$
$c_2=2r_2+m_2+(2k+1)q_2$
$c_1+c_2=2r_1+m_1+(2k+1)q_1+2r_2+m_2+$
$\quad +(2k+1)q_2=2(r_1+r_2)+m_1+m_2+$
$\quad +(2k+1)(q_1+q_2)$ If $2(r_1+r_2)+m_1+m_2<(2k+1)$, then:
$((c_1+c_2) \bmod (2k+1)) \bmod 2 = (m_1+m_2) \bmod 2$ Product calculation is analogous:
$c_1c_2=$
$\quad (2r_1+m_1+(2k+1)q_1)(2r_2+m_2+(2k+1)q_2)$
$\quad 2(2r_1r_2+r_1m_2+r_2m_1)+m_1m_2+(2k+1)q,$ where
$q=2r_1q_2+m_1q_1+2r_2q_1+m_2q_1+q_1q_2(2k+1)$ The above approach can be interpreted as follows:

Let $m_1$, $m_2$ be two bits that need to be involved in an operation. After the encryption it is impossible to determine what these bits are. There can be four coded possible pairs: (0,0), (0,1), (1,0), (1,1). Placed in a certain order the pairs look like:
$m_1$: 0 0 1 1
$m_2$: 0 0 1 1
    0 1 2 3

The bottom line is a number of a possible state, one of four. Such a table contains all possible states of bit pairs. If $f(m_1, m_2)$ needs to be calculated, the function f is a two-variable function. The function f for all possible $m_1$, $m_2$ has no more than four different values. In order to break the encryption, the position in the table has to be guessed. In other words, the position within the table is a secret key.

Another embodiment takes into consideration classes of polynomial functions. For example, a plurality of polynomial functions with two variables over a field $Z_2$. All of these functions look like $a_0 1+a_1 x+a_2 y+a_3 xy$. A plurality of functions makes a ring where the degree does not increase after multiplication, because of relationship:
$x^2=x, y^2=y$.

In this case, homomorphisms are created by affinity mapping only.

Let $m_1$, $m_2$ be a pair of bits having corresponding polynomials:
$m_1+a_1 x+a_2 y+a_3 xy$
$m_2+b_1 x+b_2 y+b_3 xy$ Homomorphism by affinity mapping is:
$x=u+v$
$y=v+1$ Then, the polynomials are transformed into new polynomials:
$m_1+a_1(u+v)+a_2(v+1)+a_3(u+v)(v+1)=m_1+a_2+(a_1+a_3)u+$
$\quad (a_2+a_3)v+a_3 vv=$
$m_1+a_2+(a_1+a_3)u+(a_2+a_3)v+a_3 v=m_1+a_2+(a_1+a_3)u+a_2 v$ Second bit is analogous:
$m_2+b_2+(b_1+b_3)u+b_2 v$ Then, these polynomials are sent for secret calculations.

If a product of $mm_1m_2$ needs to be calculated, the following computation is performed:
$[m_1+a_2+(a_1+a_3)u+a_2 v][m_2+b_2+(b_1+b_3)u+b_2 v] = (m_1+a_2)(m_2+b_2)+\ldots$ The polynomial of the same degree is returned to the client. The client performs a reverse transformation:
$u=x+y+1$
$v=y+1$ and uses a coefficient of a free member that equals $m_1 m_2$.

According to another embodiment, degrees remain the same. A field $Z_p$ (p is a prime number).

A ring $Z_p[x]/R(x)$, where R(x) is a polynomial of a degree d with a reverse coefficient (at higher degree). Then, $Z_p[x]/R(x)$ is a ring of polynomials to the power of d–1. Rings like $Z_p[x]/R(x)$ are created in error corrections codes. Secret computations for elements of the ring $Z_p[x]/R(x)$ will result in polynomials with the same degree (it does not get higher).

If two polynomials $f(x), g(x) \in Z_p[x]/R(x)$ need to be multiplied, then a secret polynomial $x=u(y)$ is selected and polynomials f(u(y)), g(u(y)) and R(u(y)) are created. All three polynomials are sent to the server and a product $f(u(y)) \times g(u(y))$ is calculated within a ring $Z_p[y]/R(u(y))$. The returned result is restored as described above.

The above described embodiments can be used with coefficients of any finite field. In other words, $Z_p$ can be any finite field.

According to another embodiment, multiplication can be performed in Galois fields For example the operation $G(2^7)=G(128)$ needs to be made secret.

Let $m_1, m_2 \in G(2^7)$

A set of polynomials with two variables is $G(2^7)[x, y]/(x^2-x, y^2-y)$.

These polynomials look like $a_0 1+a_1 x+a_2 y+a_3 xy$, $a_0, a_1, a_2, a_3 \in G(2^7)$.

Then, multiplication is:

$$(a_0 1+a_1 x+a_2 y+a_3 xy)(b_0 1+b_1 x+b_2 y+b_3 xy)=a_0 b_0 1+ \\ (a_0 b_1+a_1 b_0+a_1 b_1)x+(a_0 b_2+a_2 b_0+a_2 b_2)y+(a_0 b_3+ \\ a_3 b_0+a_3 b_1+a_1 b_2+a_2 b_1+a_3 b_3+a_2 b_3+a_1 b_3+a_3 b_2)xy \quad (1)$$

where $a_i b_j$ is a product in $G(2^7)$.

A pair of corresponding polynomials
$m_1+a_1 x+a_2 y+a_3 xy$
$m_2+b_1 x+b_2 y+b_3 xy$
are found for a pair of elements $m_1, m_2 \in G(2^7)$ Then, a substitution of variables is performed
$x=u+v$
$y=v+1$ This results in
$m_1+a_2+(a_1)u+a_2 v$ $m_2 + b_2 + (b_1 + b_3)u + b_2 v$ Then, the data can be sent to a server for calculations (for example, compute a product $m_1 m_2$), according to multiplication rules in $G(2^7)$.

The result is returned and reverse substitution is preformed. Alternatively, a point with coordinates $(x_0, y_0)$ is selected as a secret key.

The polynomial coefficients are selected as follows:

$b_0 1 + b_1 x + b_2 y + b_3 xy$
$a_0 1 + a_1 x + a_2 y + a_3 xy$

Then $m_1 = a_0 1 + a_1 x_0 + a_2 y_0 + a_3 x_0 y_0$
$m_2 = b_0 1 + b_1 x_0 + b_2 y_0 + b_3 x_0 y_0$ The resulting polynomials are sent to a server for computation. When the result is returned, the secret point (i.e., key) is substituted into the polynomial for revealing the calculated value. Note that for the previous calculation, the secret point is (0, 1).

In another embodiment, the coefficients are taken from $G(2^7)$. The solution in this case is purely algebraic, since the value at a secret point is not relevant.

Note that for all operations with Galois fields and with polynomials, different techniques can be used. One example is described in Shay Gueron and Michael E. Kounavis, Intel® Carry-Less Multiplication Instruction and its Usage for Computing the GCM Mode, incorporated herein by reference.

According to the exemplary embodiment, the homomorphic encryption is used for secure cloud computing. The mathematical models are described above. The application can be implemented in Java, but not limited to this computer language. The application uses a proprietary library that performs calculations (e.g., additions, subtractions, multiplication, division, square root, root of an $n^{th}$ power, exponentiation, etc.) on polynomials and rational functions. According to the exemplary embodiment, the library is adapted for confidential (i.e., secure) calculations.

According to the exemplary embodiment, the client performs the following logic. The client application is a browser applet that has an input box and buttons corresponding to numbers and operations. The client inputs into the box a mathematical expression containing real numbers, brackets, operation symbols and functions. The expression from the box is interpreted into a function $f(x_1, x_2, \ldots, x_n)$ at a point $(a_1, a_2, \ldots, a_n)$, where $a_1, a_2, \ldots, a_n$ are real number from the expression.

Then, syntax analysis of the client expression from the input box is performed. For each real number a unique variable $(a_1, a_2, \ldots, a_n)$ is assigned. The function is presented in a string form. When the use presses the "=" button, the real numbers $(a_1, a_2, \ldots, a_n)$ are coded by a set of polynomials. Then, a request, containing the coded numbers and function values for these numbers, is sent to the server.

The polynomials for real numbers are generated as follows:
randomly selected real number $x_0$ is a secret key;
randomly selected $b_i$, $\forall i = 1, \ldots, n$;
$\forall i$ selected $c_i$, such that $b_i, x_0 + c_i = a_i$.

After the appropriate operations are performed on the server, the client receives a resulting polynomial with one variable. The value $x_0$ is substituted into the resulting polynomial. The result is calculated using the Gorner scheme. Note that calculation of value of the polynomial at the point serves as decryption. A result equal to the value of the expression is entered into the field of a user form.

According to the exemplary embodiment, the server side implements the following logic. A multi-stream server waits for client requests. A number of clients served can be set using special parameters. Each client request is processed in a separate stream. The server receives an object containing a set of variables coded by corresponding polynomials and functions represented by strings.

Then syntax analysis of the expression is performed using recursive descent method. The sub-tasks with low priority pass control to the sub-tasks of the high priority. The task priorities correspond to the priorities of mathematical operations (i.e., 1—functions, 2—brackets, 3—exponentiation (raising to a power), 4—multiplication/division, 5—addition/subtraction).

In the process of calculation, the function and the variables are substituted by the corresponding polynomials. The result, representing the one variable polynomial, is provided to the client. In case of exponentiation, the exponent expression is calculated first and sent to the client. The client finds the numerical value of the exponent, re-encodes the expression and sends a set of the polynomials to the server.

Note that homomorphic encryption can be used for encryption of serial numbers of components and applications. For example, a developer of the application acts as a client. Then, an encrypted key is provided for checking the serial number of the application to a special component that acts as a server. An application, once installed at the end user site, receives a serial number and checks it by launching a special algorithm that uses an encrypted key and the provided key for analysis. Since the encrypted key is not available for the application, the operations with this key for checking the serial number key are performed using homomorphic encryption. Thus, the intruder cannot recreate the key using the debugger or other reverse engineering means. Therefore, the intruder is not able to create a key generator (keygen).

The serial number can be verified as follows. First, without using registered party information, the serial number can be an already coded (by the client value) that is used by the algorithm on the server. Such an algorithm can use key order number with checksum. The aggregate value of the key and the check sum has to be long enough (4, 6 or 8 bytes) to withstand a brute force attack.

Subsequently, this value is encrypted by the homomorphic key and is passed to the server. The server checks the integrity of the checksum. Note this value is decrypted on the server and validity of the serial number is confirmed. In order to intrude, the homomorphic encryption procedure has to be broken, which is virtually impossible. Note that the result does not depend on where it is calculated, as the result uses the provided serial number and invisible (internal) instruction for checksum verification.

First implementation is used if some unique application data is involved (for example, registration number, hardware ID, user email, user name, etc.). This unique data is given in plaintext to a component that acts as a server. In this case the above described method for mixing the plaintext data into server calculations can be used. Alternatively, this data (i.e., an ID of hardware components, check sums, user names, etc.) can be sent to a registration server and mixed it there with the unique version serial number that contains not only some number, but a derivative from user data. Then, the above described procedure is executed.

Note that homomorphic transformation is used only for those parts of the calculations where mathematical operations need to be performed. For example, a database entry can contain two numerical and three string fields. To decrypt the numerical fields, for subsequent use and ranking, homomorphic transformation is used. String fields can be encrypted with any key, including a key that gives different results for the same contents.

The result of the transformation can also be encrypted prior to transmittal from server to client, and can also satisfy requirements of homomorphic transformation. In other words, initial data vectors, functions and their superposition, in the preferred case, should also satisfy homomorphism.

A simple example of data mixing: an ordered list is created from several encrypted entries. Each entry is given an encrypted order number—which is a result of operations on the server.

The exemplary embodiment can also be implemented as operations on Galois Field (GF). Calculations on GF(128)—multiplication and addition can be used in the proposed method for manipulations with the polynomials used for fully homomorphic calculations.

According to the exemplary embodiment, a finite set of initial numerical elements is used. A finite set of operations is applied to the numerical element so that result of the operation on any set of the elements belongs to the finite set of the initial numerical elements. Note that standard addition or multiplication does not work, because these operations produce the results that do not belong to the finite set of the initial numerical elements. Therefore, the Galois field elements are used as the initial elements and the operation of multiplication and addition are performed according to the rules of the Galois field.

According to the exemplary embodiment, the finite set of the initial elements is transformed (encrypted) into a set of encrypted elements so each of the encrypted elements has only one corresponding initial element. A result of an operation on any pair of the encrypted elements produces a resulting encrypted element belonging to the set of the encrypted elements. According to one exemplary embodiment, the Galois field addition operation performs addition and/or multiplication and/or reduction of power of a polynomial.

In other words, in a homomorphic encryption scheme, each operation on the encrypted elements has only one corresponding operation on the initial (unencrypted) elements, which produces a resulting initial element corresponding to the resulting encrypted element. According to the exemplary embodiment, a set of initial elements is formed on a user side. Then, the set of the initial elements is transformed into a set of the encrypted elements.

Then, operations on the encrypted elements are performed and the resulting encrypted elements are produced. Subsequently, the elements from the initial set corresponding to the resulting encrypted elements are selected. According to one exemplary embodiment, the initial elements are transformed into the encrypted elements by a first encryption algorithm (using first encryption key). Subsequently, a reverse transformation uses a first decryption algorithm (using a first decryption key). Then, any N-th operation on two encrypted elements produces a result which can be transformed into the initial element by N-th decryption algorithm using the first decryption key.

Alternatively, N-th decryption algorithm requires an additional decryption key different from the first key. According to one exemplary embodiment, the homomorphic encryption scheme uses an encryption polynomial $h(x)=\xi+(x-\lambda)*r(x)$, where $r(x)$ is an arbitrary polynomial from the Galois field $G(2^n)[x]$. Note that the polynomial matrix has a zero denominator and a small range d/2, if the degree of the encrypting polynomial is d. The range does not change depending on an arbitrary degree of the polynomial. In homomorphic encryption, multiplication of the polynomials does not increase degree of the encryption polynomial by using the polynomials of the Galois ring.

In one embodiment, the Galois field elements can be used in a form of prime numbers or in a form of vectors in one-dimensional coordinate system. Note that addition or multiplication of the vectors is performed by modulo value (i.e., without considering the direction), which keeps the result within a given Galois ring.

If the polynomial operations require many multiplications or equivalent operations, then the degree of the resulting polynomials increases dramatically, which makes it difficult to use this concept for public/private key generation on the server side. To avoid this, a polynomial $c(x)$ of degree d+1 is constructed, such that at a secret point $z_0$, $c(z)=0$. The polynomial $c(x)$ becomes an open key and is sent to the server. In this case, any multiplication of the polynomials on the server is done using modulo $c(x)$, therefore, there is no increase in the degree of the polynomials. To generate such a polynomial, it is sufficient to take any polynomial $w(x)$ of degree d, then $c(x)=w(x)(x-z_0)$.

More generally, to reduce the increase in the degree of the polynomial during encrypted multiplication, the following is proposed. Select a polynomial $s(x) \in GF(2^n)[x]$. The polynomial can presumably be factored into a large number of simple factors. The simplest case is linear factors:

$s(x)=(x-\lambda_1)(x-\lambda_2) \ldots (x-\lambda_p)r(x)$, where $r(x)$ is an arbitrary polynomial. The elements $\lambda_1, \lambda_2, \ldots \lambda_p \in GF(2^n)$ are randomly selected. It follows that $s(\lambda_i)=0$, $i=1, 2, \ldots, p$.

Consider the ring $GF(2^n)[x]/s(x)$. Select a secret element $\lambda_0$ from the set $\lambda_0 \in \{\lambda_1, \lambda_2, \ldots \lambda_p\}$. For any pair, $\xi_1, \xi_2 \in GF(2_n)$ select two polynomials $h_1(x), h_2(x) \in GF(2_n)[x]/s(x)$ such that $h_1(\lambda_0)=\xi_1$, $h_2(\epsilon_0)=\xi_2$. Multiplication of the polynomials is done in the ring $GF(2^n)[x]/s(x)$, therefore, the product does not have a higher degree. The product looks as follows:

$h_1(x)h_2(x)=u(x)s(x)+v(x)$,

Therefore, in the ring $GF(2^n)[x]/s(x)$, $h_1(x)h_2(x)=v(x)$. On the other hand, at the point $\lambda_0$, we get $h_1(\lambda_0)h_2(\lambda_0)=u(\lambda_0)s(\lambda_0)+v(\lambda_0)=v(\lambda_0)$ since $s(\lambda_0)=0$.

Thus, $\xi_1 \xi_2=h_1(\lambda_0)_2(\lambda_0)=v(\lambda_0)$. The degree of the polynomial $v(x)$ is no higher than the degree of the polynomials $h_1(x), h_2(x)$.

The polynomial $s(x)$ needs to be sent to the server, together with the data itself.

To reduce n, the previous construction can be modified. Consider again the ring $GF(2^n)[z]$, where a unitary polynomial $w(z)$ is selected. Consider a subset $R(z)$ of polynomials from the ring $GF(2^n)[z]$, such that $f(z) \in R(z)$ if and only if $f(z)=\alpha \mod(w(z))$, where $\alpha$ is an arbitray element from $GF(2^n)$. The set of $R(z)$ is a ring, and any element $f(z) \in R(z)$ can be represented by $f(z)=g(z)w(z)+\alpha$. Note that the previous construction corresponds to the case where $w(z)=z-\theta$.

Consider a given set of elements $\lambda_1, \lambda_2, \lambda_3, \ldots \lambda_p GF(2^n)$, on which encrypted operations need to be performed. A set of polynomials $f_i(z)=g_i(z)w(z)+\lambda_i$, $i=1, 2, \ldots, p$ are used to encrypt the elements. The polynomials are sent to the server. Since $R(z)$ is a ring, the calculations will be performed correctly, and the encryption is homomorphic.

This construction, however, has a problem with an increase in the degree of the polynomials. To avoid this, select a unitary polynomial $u(z)$, which has the same degree as $w(z)$. The polynomial $s(z)=u(z)w(z)$ can be constructed. Then, all calculations are performed in the ring $GF(2^n)[z]/s(z)$. To show that the calculations are correct, consider multiplication of two elements of the Galois field, $\lambda_1, \lambda_2$. The corresponding encrypting polynomials are $f_1(z)=g_1(z)w(z)+\lambda_1$, $f_2(z)=g_2(z)w(z)+\lambda_2$. The product of these polynomials in the ring $GF(2^n)[z]/s(z)$ has the form $h(z)=f_1(z)f_2(z) \mod(s(z))$. Using the Chinese remainder theorem, to calculate $f_1(z)f_2(z) \mod(s(z))$ it is sufficient to calculate $F_1(z)f_2(z) \mod(u(z))$, $f_1(z)f_2(z) \mod(w$ (z)). Since u(z), w(z) have the same degree, the calculation is correct. On the other hand, $f_1(z)f_2(z)\bmod(w(z))=(g_1(z)w(z)+\lambda_1)(g_2(z)w(z)+\lambda_2)\bmod(w(z))=\gamma_1$ XOR $\gamma_2$. From this, it follows that $h(z)\bmod(w(z))=\gamma_1$ XOR $\gamma_2$. Thus, if the server returns h(z), then the product can be recovered from it, without calculating roots.

The approach described herein is applicable to many scenarios where the server or cloud service has to perform calculations on data without knowing what the data itself is. For example, operations with databases can be performed in this manner. Operations with bank account verifications can also be performed in this manner. A user has an account at bank A and an account at bank B. Both banks provide the balances (in encrypted form) to the cloud service, which then adds them homomorphically, and provides the result to a third party. Thus, the third party will know the total balance in the accounts A and B—but not the balance in each individual account.

One of the advantages of some of the embodiments described herein is that calculations on Galois fields $GF(2^n)$ may be easily performed on hardware level. E.g., the sum of Galois field elements is performed via XOR operation, which is a single hardware step hardware on most processors. Also, calculations on Galois fields never result in invalid data, "buffer overflows" or errors of that nature. Also, the proposed approach protects from brute force code hacking.

With reference to FIG. 1, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24.

The personal computer 20 may further include a hard disk drive 27 for reading from and writing to a hard disk, not shown in the figure, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide a non-volatile storage of computer readable instructions, data structures, program modules/subroutines, such that may be used to implement the steps of the method described herein, and other data for the personal computer 20.

Although the exemplary environment described herein employs a hard disk, a removable magnetic disk 29 and a removable optical disk 31, it should be appreciated by those skilled in the art that other types of computer readable media that can store data accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., WindowsTM 2000).

The computer 20 includes a file system 36 associated with or included within the operating system 35, such as the Windows NT® File System (NTFS), one or more application programs 37, other program modules 38 and program data 39. A user may enter commands and information into the personal computer 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices, such as speakers and printers.

The personal computer 20 may operate in a networked environment using logical connections to one or more remote computers 49. The remote computer (or computers) 49 may be represented by a personal computer, a server, a router, a network PC, a peer device or other common network node, and it normally includes many or all of the elements described above relative to the personal computer 20, although only a memory storage device 50 is illustrated. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46.

In a networked environment, program modules depicted relative to the personal computer 20, or portions thereof, may be stored in the remote memory storage device. It will be appreciated that the network connections shown are exemplary and other means of establishing a communications link between the computers may be used. Such computers as described above can be used in conventional networks, e.g. the Internet, local area networks, regional networks, wide area networks, and so forth. These networks can link various resources, such as user computers, servers, Internet service providers, telephones connected to the network and so on.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A system for protected cloud computing to provide a cloud service, the system comprising:
   a server receiving encrypted data from a client; and
   the cloud service implemented on the server performing fully homomorphic calculations for the client without decryption of the encrypted data and providing a result of the calculations to the client for decryption,
   wherein:

a finite set of initial elements are generated on the client and are fully homomorphically encrypted into a set of n encrypted elements, such that all calculations on unencrypted elements correspond to the same calculations on encrypted elements, the n encrypted elements belong to the finite set of the initial elements and each of the n encrypted elements has only one corresponding initial element, and the initial elements are encrypted using an n-bit secret key $z_0$ that belongs to a Galois field $G(2^n)$, and for any initial element u of a Galois field $G(2^n)$ there are n randomly generated elements a1, a2, ..., ad of $G(2^n)$ for which $a_0 = u - (a_1 z_0 + a_2 (z_0)^2 + \ldots + a_d (z_0)^d)$, and a polynomial $v(z) = a_0 + a_1 z + a_2 z^2 + \ldots + a_d z^d$ from a Galois field $G(2^2)[z]$ corresponds to u with $v(z) = u$, with the coefficients $a_d$ used as a public encryption key, and wherein the encryption uses an encryption polynomial $h(z) = u + (z - z_0) * r(z)$ where $r(z)$ is an arbitrary polynomial from the Galois field $G(2^n)[z]$, and $z_0$ and u are fixed elements of the Galois field $G(2^n)[z]$.

2. The system of claim 1, wherein Galois field elements are used as the initial elements.

3. The system of claim 2, wherein the Galois field elements are prime numbers.

4. The system of claim 2, wherein the Galois field elements are vectors.

5. The system of claim 2, wherein the Galois field elements correspond to real numbers.

6. The system of claim 1, wherein an operation on any pair of the encrypted elements produces an encrypted element belonging to the set of the encrypted elements.

7. The system of claim 1, wherein a result of the calculations performed on the server is encrypted and the decryption requires the secret key $z_0$.

8. The system of claim 1, wherein a reverse transformation uses a decryption algorithm and the secret key $z_0$, and for any initial element u of the Galois field $G(2^n)[z]$, there are n randomly generated elements $a_1, a_2, \ldots, a_d$ of the Galois field $G(2^n)[z]$.

9. The system of claim 1, wherein each operation on the encrypted elements has only one corresponding operation on the initial elements, and the operation produces a resulting initial element corresponding to the resulting encrypted element.

10. The system of claim 1, wherein the encrypted elements are polynomials, and all operations, including any multiplication operations, are performed on the encrypted elements without increasing a degree of the polynomials.

11. The system of claim 1, wherein the encrypted elements are polynomials, and all operations, including any multiplication operations, are performed on the encrypted elements and result in polynomials having a degree no higher than original polynomials.

12. The system of claim 1, wherein the encrypted elements are polynomials, and all operations, including any multiplication operations, are performed on the encrypted elements and result in polynomials having a degree that is a constant known prior to the operations.

13. A computer-implemented method for protected cloud computing to provide a cloud service, the method comprising configuring at least one computing device to perform the functions of:

the cloud service implemented on a server to perform calculations for a client, wherein the server performs calculations without decryption of encrypted data and provides a result back to the client, such that the client can decrypt the result;

generating a finite set of initial elements on the client and fully homomorphically encrypting the finite set of initial elements into a set of n encrypted data elements, such that all calculations on unencrypted elements correspond to the same calculations on encrypted elements, transmitting the n encrypted data elements to the server;

wherein the n encrypted elements belong to the finite set of the initial elements and each of the n encrypted elements has only one corresponding initial element on the server receiving encrypted data from the client, wherein the initial elements are encrypted using an n-bit secret key $z_0$ that belongs to a Galois field $G(2^n)$, and wherein, for any initial element u of a Galois field $G(2^n)$ there are n randomly generated elements a1, a2, ..., ad of the Galois field $G(2^n)$ for which $a_0 = u - (a_1 z_0 + a_2 (z_0)^2 + \ldots + a_d (z_0)^d)$, and a polynomial $v(z) = a_0 + a_1 z + a_2 z^2 + \ldots + a_d z^d$ from $G(2^n)[z]$ corresponds to u with $v(z_0) = u$, with the coefficients a1, a2, ..., ad used as a public encryption key, and wherein the encryption uses an encryption polynomial $h(z) = u + (z - z_0) * r(z)$, where $r(z)$ is an arbitrary polynomial from a Galois field $G(2^n)[z]$, and $z_0$ and u are fixed elements of the Galois field $G(2^n)[z]$.

14. The method of claim 13, wherein the coefficients are generated from a random number k, with 2<k<n, and a secret set of elements $s_{ij} \in GF(p^n)$ i=1, 2, ..., k, j=k+1, ..., n, which are the same for the session, for both client and server, wherein p is a prime number, and wherein the coefficients $a_1, a_2, \ldots, a_k$ are selected based on $a_i = s_{i1} a_{k+1} + s_{i2} a_{k+2} + \ldots + s_{id} a_d$, i=1, 2, ..., k, and the coefficients $a_{k+1}, a_{k+2}, \ldots, a_n$ are randomly selected.

15. The method of claim 14, wherein p=2.

16. The method of claim 15, wherein p elements $\lambda_1, \lambda_2, \ldots \lambda_p$ of any Galois Field and the polynomial r(x) of a degree k are used to generate a polynomial s(x) of a degree k+p, s(x) in a form of $s(x) = (x - \lambda_1)(x - \lambda_2) \ldots (x - \lambda_p) r(x)$;

element $\lambda_0$ is selected from the set $\lambda_1, \lambda_2, \ldots \lambda_p$ and is used as the secret key;

u being the data on which server operations are performed using a polynomial $f(x) = a_0 + a_1 x + a_2 x^2 + \ldots + a_{k+p-1} x^{k+p-1}$ of a degree k+p−1, such that $u = f(\lambda_0) = a_0 + a_1 \lambda_0 + a_2 (\lambda_0)^2 + \ldots + a_{k+p-1} (\lambda_0)^{k+p-1}$, wherein u and s(x) are transmitted to the server, all calculations are performed in the ring $GF(2^n)[x]/s(x)$, and a degree of any resulting polynomial is no higher than k+p−1.

* * * * *